UNITED STATES PATENT OFFICE.

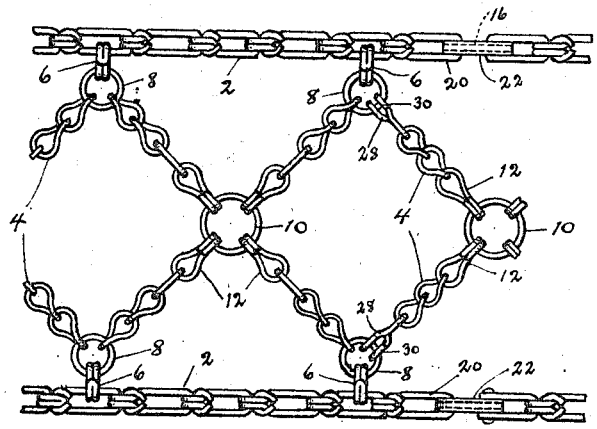
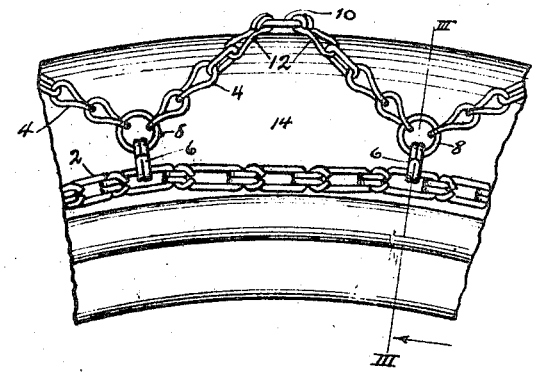
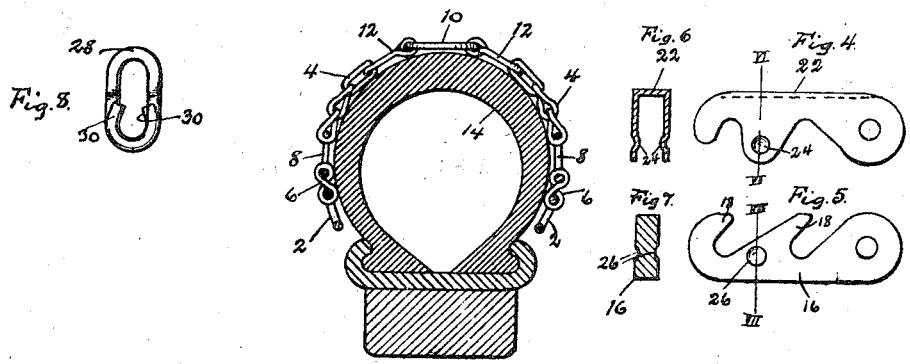

ROY T. HUGHES, OF KANSAS CITY, MISSOURI.

ANTISKIDDING TIRE-CHAIN.

1,193,392.  Specification of Letters Patent.  Patented Aug. 1, 1916.

Application filed October 22, 1915. Serial No. 57,282.

*To all whom it may concern:*

Be it known that I, ROY T. HUGHES, a citizen of the United States, residing at Kansas City, in the county of Jackson and State of Missouri, have invented certain new and useful Improvements in Antiskidding Tire-Chains, of which the following is a complete specification.

This invention relates to improvements in chain armor for pneumatic tires and particularly to tire chains adapted to be removably applied to the tire and comprising parallel side chains connected by transverse strands extending across the tread portions of the tire and providing an anti-slipping means therefor.

The general object sought to be attained by the present invention is the provision of an extremely simple and effective construction for the prevention of skidding and so arranged that the wear will be confined to certain tread portions which may be readily replaced with but small expense. For accomplishing this object, use is made of suitable parallel side chains and a novel arrangement of transverse connecting strands in which are included replaceable wear and anti-slipping elements so disposed as to serve the purpose required.

With this general object in view the invention will now be described with reference to the accompanying drawing illustrating one form of embodiment thereof, after which those features and combinations deemed to be novel will be set forth in the appended claim.

In the drawing—Figure 1 is a plan view of a section of tire chain embodying the present improvements; Fig. 2 is a side elevation of a portion of a pneumatic tire with the chain applied thereto; Fig. 3 is a transverse section through the same on the line III—III of Fig. 2; Figs. 4 and 5 are enlarged plan views showing the elements of one of the detachable links for the side chains, and Figs. 6 and 7 are sections through the same on the lines VI—VI and VII—VII, respectively, of Figs. 4 and 5; and Fig. 8 is a plan view of one of the detachable links for the diagonal chains.

Referring to the drawing in detail, the present construction comprises a pair of parallel side chains 2, 2, of the usual or any preferred type, and connected by transverse strands arranged substantially as illustrated in Fig. 1. These transverse strands are made up of two series of chain links 4 extending in zigzag relation at angles of about 45 degrees to the chains 2. At spaced intervals connection is made with the side chains 2 by means of the links 6, of closed-hook form whereby the connection is rendered detachable by opening one end of any one of such links 6 when desired. At the links 6 the transverse strands are provided with ring links 8 for obtaining the desired angular or zigzag arrangement, and at the meeting points of said two series of strands, midway between the side chains 2, ring links 10 are provided (somewhat larger than the links 8) for joining the series at these points. Connection is made with the ring links 10 by means of the hook-links 12 so that the connection is rendered detachable as with the links 6; and furthermore, the arrangement is such that when the armor is applied to the tire 14, as in Fig. 2, the hook-portions of said links 12 are presented outermost so as to form the tread portions of the armor along the tread line of the tire. The advantages of such a construction will be apparent. An effective arrangement is provided for the prevention of tire skidding in any direction, the hook portions of the tread links 12 forming tread elements affording a secure gripping action with ample wearing surfaces, and as these are the elements which must be replaced after a given period of service, such replacement may be accomplished in an expedient manner by simply spreading said hook portions of these links 12, and substituting new ones. Thus in the course of ordinary service, these small individual elements 12 will be practically the only parts ever requiring renewal, since the wear is substantially all taken up by them, and the cost of such renewal is quite small as compared with the expense of replacing larger tread surfaces or whole sections of the armor web. Again, while giving ample wearing surface as well as gripping action, this is secured by as light a construction as possible consistent with adequate strength and durability.

The use of hook links at the points of attachment to the side chains enables the sections of the transverse or zigzag strands (that is, from one link 10 to the next succeeding link 10 in either direction) to be renewed in case any portions of these in addition to the links 12 should become worn or defective, such sections thus being separately or individually renewable without disturbing any other portions of the armor. It will be understood that all the links of the transverse or zigzag strands, with the exception of the hook links 6 and 12, and including the ring links 8 and 10, are of solid or continuous construction, and not adapted to be spread or opened as in the case of the links 6 and 12.

For application to or removal from the tire, any form of separable link construction may be employed, the drawing illustrating the side chains as provided with the pivoted connecting bars 16, each having the plurality of hooks 18 for engagement with one of the terminal links 20, each bar 16 also having a pivoted closure or guard member 22 provided with the knobs 24 for snapping into the recesses 26 of the bar. For disconnecting the transverse strands at the corresponding ring links 6, open-ended turn-links 28 (see Fig. 8) may be used, these being formed with oppositely disposed hooks 30 adapted, on turning of the link, to disengage the ring link and permit the latter to pass out between the hook portions 30.

While the foregoing represents what is now deemed to constitute the preferred form of embodiment of the improvements, the right is reserved to such formal changes and modifications as may fairly fall within the scope of the following claim.

Claim:

In a tire armor construction, a tread member comprising a ring provided with securing chains connected thereto by means of replaceable hook links having their hook portions extending outwardly in position to act as tread surfaces and projecting a sufficient distance above said ring to relieve the latter from tread wear.

R. T. HUGHES.